Feb. 12, 1952  J. B. WHITLOW  2,585,886
TORQUE CONVERTER
Filed Nov. 1, 1949
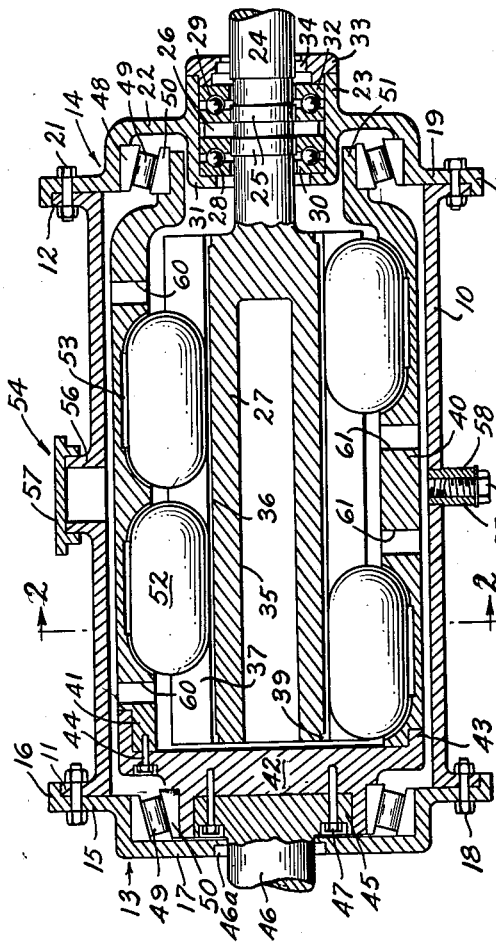
Inventor
JOHN B. WHITLOW
By Munn, Liddy & Glaccum
Attorneys

Patented Feb. 12, 1952

2,585,886

UNITED STATES PATENT OFFICE 2,585,886

TORQUE CONVERTER

John B. Whitlow, Granite City, Ill.

Application November 1, 1949, Serial No. 124,780

8 Claims. (Cl. 74—64)

This invention relates to a power transmitting means, and more particularly to an infinitely variable transmission or torque converter.

An object of the invention is to provide a torque converter wherein power is transmitted from a driving to a driven member by means of forces exerted upon the driven member by intermediate roller bearings or other medium.

A further object of my present invention is the provision of a torque converter wherein power transmitting roller members are guided in oppositely inclined bearing recesses in the driven member, thereby effectively balancing lateral forces present and making vibration negligible.

Another object of the invention is the provision of a power transmission in which the force tending to revolve the driven member will vary approximately as the square of the velocity of the transmitting medium.

A still further object of the invention is to provide a torque converter in which type the transmitting medium may be changed without altering the design of other elements of the device.

A further advantage of my present invention lies in the fact that energy put into my torque converter is not lost through heat nor dissipated in turbulence, but is stored in the transmitting medium in the form of kinetic energy.

Still another advantage of the present invention is that its simplicity of design makes the torque converter economical to manufacture and maintain and the rugged construction incorporated therein does away with intricate elements commonly used in transmissions which elements are subject to excessive wear and breakage.

These and other objects and advantages of the present invention will become apparent from the following description of the present invention illustrated in the accompanying drawings, in which:

Figure 1 is a sectional view of the invention taken on the line 1—1 of Figure 2.

Figure 2 is a sectional view taken on line 2—2 of Figure 1.

Figure 3 is a diagrammatic view showing forces exerted by the roller bearings when the driving member is revolving and the driven member is stationary.

Figure 4 is a diagrammatic view showing the forces exerted by the roller bearings when the driving and driven members are revolving in unison.

Similar reference characters in the several figures represent similar parts.

In the preferred form of my invention as shown in Figure 1 of the drawing, the housing for the torque converter unit consists basically of a hollow cylinder 10 having a peripheral flange 11 on one end thereof and a similar peripheral flange 12 on the other end. Cylinder 10 is enclosed by end caps 13 and 14. Cap 13 consists of an annular ring 15, the outer periphery of which is formed with an angular flange 16, and the center of the ring contains an apertured boss 17.

As seen in Figure 1 the flange 11 on the cylindrical housing of the torque converter fits snugly into the recess formed by the intersection of ring 15 and flange 16 of the end cap member. The two elements are rigidly connected by means of a plurality of bolt members 18 spaced around the ring at selected intervals.

The cap 14 is similar to cap 13 in that it contains an annular ring 19, rimmed by the peripheral flange 20. The recess formed by the intersection of ring 19 and flange 20 receives flange 12 formed on the end of the cylindrical housing of the torque converter. Likewise, a plurality of bolts 21, secure the cap 14 to the cylinder being equally spaced around the ring, as best seen in Figure 2 of the drawing. The boss 22 formed inwardly of the annular ring 19 contains a bearing hub 23 which is adapted to support a drive shaft 24 leading from the vehicle engine or other source of power.

Drive shaft 24 is provided with a pair of annular ribs 25 which provide abutments to longitudinally support a keyed ring 26. In order to hold the driving core 27 and its attached drive shaft 24 in alinement thrust bearings 28 and 29 are positioned within hub 23. Bearings 28 are guided within the grooves formed in the bearing race 30 which in turn is secured in place by means of an inwardly depending flange 31 and the ring 26. The bearing race 32 is longitudinally positioned between ring 26 and a central apertured closure ring 33, which is press-fitted into the outer end of hub 23. The aperture provided in member 33 is of greater diameter than driving shaft 24 in order to accommodate a suitable packing ring 34 in order to prevent leakage of lubricant from within the torque converter unit.

The driving core 27 is a hollow member having a central bore 35 therein. As best seen in Figure 2 of the drawing, the outer surface of the core member 27 has a fluted appearance resulting from a plurality of arcuate recesses 36 equally spaced around the periphery thereof. In the preferred form of the invention I have shown six of such recesses, each having press-fitted therein a removable bearing insert 37. These inserts are retained within recesses 36 by means of longitudinal flanges 38 and arcuate end flanges 39 (Figure 1). Since inserts 37 are removable it will be seen that they may be easily replaced should wear or unforeseen damage occur.

The driven element of my torque converter unit consists of a cylindrical sleeve 40, the outer diameter of which is slightly less than the inner diameter of the housing sleeve 10 in order that the driven member may be inserted within sleeve 10 and held in spaced relation thereto. One end of sleeve 40 contains a tapered flange 41 which is closely received in a recess formed by the intersection of a coupling plate 42 and its peripherally tapered flange 43. The members are secured by means of threaded screws 44, the heads of which are lodged in recesses formed in coupling member 42 in order to obviate unnecessary friction surfaces.

The outer face of member 42 is provided with a centrally positioned circular recess into which fits an enlarged mating end 45 on the driven shaft 46. End 45 is secured to coupling member 42 by means of a plurality of inset screws 47.

Packing means, such as the ring 48a, provide a lubricant seal around the driven shaft. In order to support the driven member within the torque converter housing I have provided at the ends thereof an annular bearing ring 48 having associated therewith a plurality of anti-friction rollers 49. The rollers 49 in turn contact annular bearing tracks 50, one of which is secured to an inwardly extending rim 51 of the free end of the driven member, the other being secured within a recess formed on the coupling member 42 previously described. As seen in Fig. 1 of the drawing, the anti-friction bearings are oppositely inclined with respect to the longitudinal axis of the torque converter in order to more effectively receive the thrust of the unit.

In order to provide a power transmitting medium between the driving core 27 and the driven member 40, I choose to insert a plurality of anti-friction roller members 52, two of these rollers being positioned within each arcuate bearing insert 37. Cooperating with rollers 52 are a pair of oppositely inclined races formed in the inner surface of sleeve 40 of the driven member. These races are provided with a slight recess or depression 53 formed centrally therein in order that only the arcuate side walls of the recesses will be in bearing contact with rollers 52. This feature enables the friction loss to be materially decreased, and at the same time will not diminish the driving efficiency of the unit since the driving forces are in reality only applied to the arcuate contact surfaces of the race.

It is to be understood that instead of roller bearings 52, the torque converter may be provided with conventional ball bearing elements. However, since bearing contact between the roller elements and the arcuate inserts carried by the driving core is rendered more effective by the use of elongated roller members, as shown, I prefer to use the latter design in regard to the present invention.

While the operation of the device will be hereinafter explained in detail, it will be seen that roller bearings 52 are free to move laterally in their respective arcuate inserts, and at the same time are confined to the path taken by the inclined races formed in the driven member.

In order to provide ample lubrication for the torque converter unit, I have provided the cylindrical housing 10 with a pair of oppositely disposed oil ports 54 and 55. The oil port 54 consists of an apertured boss 56 formed on the periphery of the cylinder and provided with a threaded cap member 57. Oil port 56 may, if desired, be basically merely an aperture formed in the periphery of the cylinder and having threaded or press-fitted therein an outwardly extending sleeve 58. This sleeve is internally threaded to receive a cap screw 59 to retain the enclosed lubricant within the housing.

In order to insure the free flow of lubricant to the roller bearings I have shown a pair of lubricant channels 60 located outside of the roller members and in oppositely disposed lubricant channels 61 located within the limits formed by the plurality of roller members 52. It will be seen that with the above-described structure complete lubrication may be obtained by the distribution of a small amount of oil by splash.

In the development of the invention I have utilized the theory present when a moving body travels in an arcuate path such as, for example, an express train coasting into a curve at high speed. Disregarding the friction of the wheels against the rails, etc. it is well known that theoretically the train will come out of the curve at the same speed as it went into it, even though there was a tremendous force exerted against the rails. This retention of speed is due to the fact that no work had been done. On the other hand, were it possible for the train to exert so much force against the rails that it caused the roadbed to shift, then the train would come out of the curve with its speed reduced in direct proportion to the amount of energy which was expended in moving the roadbed.

With the above example in mind I have shown in Figure 3 of the drawing a diagrammatic representation of the six roller bearings associated with one of the inclined bearing races formed on the inner surface of the driven member of my torque converter. From this figure the similarity of my machine to the train coming out of the curve approximately as fast as it entered it will be readily seen.

The inclined races of my device are formed at an angle to a plane perpendicular to the longitudinal axis of the machine. The exact angle is not critical but I have found that an angle somewhere in the neighborhood of 20° is preferable for reasons to be later discussed. If the race shown at the right side of Fig. 1 were to be laid out on a flat plane it would appear as a reverse curve track as shown at 60 in Fig. 3. The rollers 52 are activated by the revolving drive core 27 which tends to move each roller to the right as viewed in Fig. 3.

As will be seen from the drawing, the rollers are guided in the curved path of the race in the same manner as the above-mentioned train, the opposed rail or edge of the race acting as a cam causing the rollers to be laterally oscillated in their respective recesses in the driving core. The rollers in the same manner as the train have a tendency to straighten out the track and since they are compelled to follow the arcuate path each creates forces exerted alternately against opposite sides of the race as indicated in Fig. 3. It is to be noted that the diagrammatic representation shown in Fig. 3 illustrates the rollers moving at an initial constant velocity and with the driven member stationary.

It will be seen that the force parallelograms of the rollers U and X are slightly more narrow than those of W and Z. This variation in size is due to the fact that the rollers V and Y are at the extremes of lateral movement, and their lateral acceleration is being started. The slight friction between the rollers and the core adds to the inertia applied to the driven member through the sides of the race, causing the force parallelograms of W and Z to have an added "thickness." After the rollers have crossed the center line (of Fig. 3) their deceleration starts. The slight friction between the rollers and the core causes a slight force to be subtracted from the inertia forces of the rollers thrown against the sides of the race as the race stops the lateral movement of the rollers. This force subtracted from the inertia force applied to the driven member as the race stops the lateral movement of the roller causes the parallelograms of U and X to be slightly more narrow than if there were no friction. As the frictional forces of W and Z are added to the inertia forces applied against the driven member by the sides of the races causing the rollers to be laterally accelerated, the force parallelograms of W and Z are slightly thicker than they would be if there were no friction.

From Fig. 3 it is apparent that it is important not to design the races in such a manner as to not have the aforementioned angle of inclination so great that in the force diagram the resultant forces in the phases A—B and C—D will indicate that a reversing torque is being applied by the rollers to the driven member in those periods.

In order to get the vehicle (or other device) equipped with my torque converter moving the source of power or engine is accelerated causing the driving shaft, driving core and rollers to revolve with a proportionately higher speed. This increased speed of the roller members will naturally cause increased forces to be exerted against the races tending to rotate the driven member of the unit. As apparent from the formulae $E_k = \frac{1}{2}Mv^2$, these forces will vary not directly in proportion to the increase of the velocity but will vary as approximately the square of the velocity. For example, if the engine is accelerated from idling at 300 R. P. M. to a speed of 3000 R. P. M., not 10 times the torque, but almost 100 times the torque would be applied by the rollers to the driven member and to the driven shaft.

Up to the point where the torque proved sufficient to move the vehicle, the energy put into this converter by the engine would not be lost through heat nor dissipated in turbulence as in present fluid drive mechanisms, but would be stored in the rollers and other driving elements in the form of kinetic energy since no work had been done on the driven shaft. This theory is similar to that of the train coming out of a curve at the same speed not having produced work by moving the track or roadbed. As more energy is put into this converter and stored therein, an almost infinite R. P. M. could be attained by the rollers and core, thus building up an almost infinite torque against the driven member and shaft of the unit.

When the torque has increased to a point where the resistance of the driven shaft begins to be overcome, the driven member will commence to turn due to the increased forces allowing the rollers to satisfy their tendency to "straighten out the curve." This transfer of energy from the rollers to the driven member causes the speed of the rollers, core and drive shaft to be reduced as in the previously discussed example of the train shifting the roadbed.

The lateral oscillation of the rollers by the camming action of their respective race grooves causes the path of each roller to be sharply curved in repeated cycles when the driven member is at rest as shown in Figure 3 of the drawing. When the driven member commences to revolve the rollers will follow curves more moderate than described above due to the fact that rotation of the races in the same direction as the rollers softens the sharpness of the curvature of the path. It does not however cut down the lateral extent of the oscillation. The degree of curvature in the above mentioned wavey path decreases with the increase in velocity of the driven member and at the point where the driving and driven members are revolving in unison each roller will follow a path in its own plane, as shown in Fig. 4, which path would appear as a straight line if represented on a flat surface.

In decelerating, the opposing elements in my torque converter would cause the engine to act as a brake down to a certain speed similar to the operation of the conventional fluid drive transmission. This feature has a decided advantage from the standpoint of its use with automotive vehicles as well as other machinery.

In the preferred form of the invention shown in the drawings I provide two groups of roller members guided in oppositely inclined races. With this design the lateral force components exerted by the opposing rollers will neutralize each other and the machine will be in balance with a minimum of vibration. It is of course to be understood that instead of having two races cut at opposing angles in the driven member, a single race with balanced curves cut into it could be used, the curves being so designed as to insure balancing of lateral forces exerted by the rollers. However, the use of oppositely inclined races is preferred since it is the simplest and most practical from the standpoint of unit compactness as well as from the manufacturing point of view.

The described use of my cooperating roller and race design lends itself to the presentation of many advantages not heretofore inherent in power transmission devices. First of all, heat losses occurring in the use of my converter are small, as there will be hardly more friction between the races and the rollers than in a conventional anti-friction ball bearing thrust unit. Centrifugal force will tend to hold the rollers away from the driving core and into the races, reducing the friction between the rollers and the bearing inserts 37.

Although in the preferred form of the invention I choose to use rollers with spherical ends instead of conventional balls because of better contact with the driving core, it will be apparent that almost any medium could be used in my torque converter. Fluid may be used as a medium with practically no change in the design other than removing the roller elements. Furthermore, the possibility of utilizing a transmitting medium consisting of mercury has proved feasible.

In addition to increase in efficiency afforded by my present machine, its ruggedness and simplicity cannot be overlooked as an asset. The versatility and compactness of this device render it capable of effective operation notwithstanding the many problems heretofore inherent in power transmission by means of torque converters.

While a preferred form of the invention has been shown and described, it will be understood that variation in details of form may be made without departure from the invention as defined in the appended claims.

I claim:

1. A torque converter comprising concentric driving and driven members, said driving member having a plurality of longitudinal recesses in the periphery thereof, the driven member being provided with races oppositely inclined to the axis of said driven member, the angle of inclination of said races with a plane perpendicular to the axis of the driven member being less than 30 degrees, individually rotatable means carried by said longitudinal recesses actuated by said longitudinal recesses and cooperating with said inclined races whereby the inertia of said means acts to impart motion of the driving member to the driven member.

2. In a torque converter comprising a housing having end walls thereon, a driving member having a shaft extending through one of said end walls, a hollow driven member surrounding the driving member and rotatably mounted between the driving member and the inner surface of said housing in spaced relation thereto, said driven member being connected to a shaft extending through the other of said walls, said driving member being formed with a plurality of longitudinal recesses and the driven member having at least one inclined race on the inner surface thereof, the angle of inclination of said race with a plane perpendicular to the axis of the driven member being less than 30 degrees and round bearing members carried by said longitudinal recesses and cooperating with said race whereby the inertia of said round members acts to impart motion of the driving member to the driven member.

3. In a torque converter comprising a housing having end walls thereon, a driving member having a shaft extending through one of said end walls, a hollow driven member surrounding the driving member and rotatably mounted between the driving member and the inner surface of said housing in spaced relation thereto, said driven member being connected to a shaft extending through the other of said walls, said driving member being formed with a plurality of longitudinal recesses and the driven member having on the inner surface thereof a pair of races oppositely inclined to the axis of the driven member, the angle of inclination of said races with a plane perpendicular to the axis of the driven member being less than 30 degrees and round bearing members carried by said longitudinal recesses and cooperating with said races whereby the inertia of said round members acts to impart motion of the driving member to the driven member.

4. In a torque converter comprising a housing having end walls thereon, a driving member having a shaft extending through one of said end walls, a hollow driven member surrounding the driving member and supported by means of antifriction bearing so as to be rotatably mounted between the driving member and the inner surface of said housing in spaced relation thereto, said driven member being connected to a shaft extending through the other of said walls, said driving member being formed with a plurality of longitudinal recesses and the driven member having on the inner surface thereof a pair of races oppositely inclined to the axis of the driven member, the angle of inclination of said races with a plane perpendicular to the axis of the driven member being less than 30 degrees and round bearing members carried by said longitudinal recesses and cooperating with said races whereby the inertia of said round members acts to impart motion of the driving member to the driven member.

5. A torque converter comprising concentric driving and driven members, said driving member having a plurality of longitudinal recesses in the periphery thereof, the driven member being provided with races oppositely inclined to the axis of said driven member, the angle of inclination of said races with a plane perpendicular to the axis of the driven member being substantially 20 degrees, individually rotatable means carried by said longitudinal recess actuated by said longitudinal recesses and cooperating with said inclined races whereby the inertia of said means acts to impart motion of the driving member to the driven member.

6. In a torque converter comprising a housing having end walls thereon, a driving member having a shaft extending through one of said end walls, a hollow driven member surrounding the driving member and rotatably mounted between the driving member and the inner surface of said housing in spaced relation thereto, said driven member being connected to a shaft extending through the other of said walls, said driving member being formed with a plurality of longitudinal recesses and the driven member having at least one inclined race on the inner surface thereof, the angle of inclination of said race with a plane perpendicular to the axis of the driven member being substantially 20 degrees and round bearing members carried by said longitudinal recesses and cooperating with said race whereby the inertia of said round members acts to impart motion of the driving member to the driven member.

7. In a torque converter comprising a housing having end walls thereon, a driving member having a shaft extending through one of said end walls, a hollow driven member surrounding the driving member and rotatably mounted between the driving member and the inner surface of said housing in spaced relation thereto, said driven member being connected to a shaft extending through the other of said walls, said driving member being formed with a plurality of longitudinal recesses and the driven member having on the inner surface thereof a pair of races oppositely inclined to the axis of the driven member, the angle of inclination of said races with a plane perpendicular to the axis of the driven member being substantially 20 degrees and round bearing members carried by said longitudinal recesses and cooperating with said races whereby the inertia of said round members acts to impart motion of the driving member to the driven member.

8. In a torque converter comprising a housing having end walls thereon, a driving member having a shaft extending through one of said end walls, a hollow driven member surrounding the driving member and supported by means of antifriction bearings so as to be rotatably mounted between the driving member and the inner surface of said housing in spaced relation thereto, said driven member being connected to a shaft extending through the other of said walls, said driving member being formed with a plurality of longitudinal recesses and the driven member having on the inner surface thereof a pair of races oppositely inclined to the axis of the driven member, the angle of inclination of said races with a plane perpendicular to the axis of the driven member being substantially 20 degrees and round bearing members carried by said longitudinal recesses and cooperating with said races whereby the inertia of said round members acts to impart motion of the driving member to the driven member.

JOHN B. WHITLOW.

REFERENCES CITED

The following references are of record in the file of this patent:

UNITED STATES PATENTS

| Number | Name | Date |
| --- | --- | --- |
| 1,746,545 | Malm | Feb. 11, 1930 |

FOREIGN PATENTS

| Number | Country | Date |
| --- | --- | --- |
| 550,940 | France | Dec. 23, 1922 |